United States Patent
North Morris et al.

(10) Patent No.: US 9,857,169 B1
(45) Date of Patent: Jan. 2, 2018

(54) SINGLE-STEP INTERFEROMETRIC RADIUS-OF-CURVATURE MEASUREMENTS UTILIZING SHORT-COHERENCE SOURCES

(71) Applicant: 4D TECHNOLOGY CORPORATION, Tucson, AZ (US)

(72) Inventors: Michael North Morris, Tucson, AZ (US); James Millerd, Tucson, AZ (US)

(73) Assignee: 4D TECHNOLOGY CORPORATION, Tucson, AZ (US)

( * ) Notice: Subject to any disclaimer, the term of this patent is extended or adjusted under 35 U.S.C. 154(b) by 0 days.

(21) Appl. No.: 15/385,143

(22) Filed: Dec. 20, 2016

Related U.S. Application Data (60) Provisional application No. 62/270,492, filed on Dec. 21, 2015, provisional application No. 62/270,500, filed on Dec. 21, 2015.

(51) Int. Cl.
*G01B 11/24* (2006.01)
*G01B 11/255* (2006.01)
*G01B 9/02* (2006.01)

(52) U.S. Cl.
CPC ........ *G01B 11/255* (2013.01); *G01B 9/02049* (2013.01)

(58) Field of Classification Search
CPC ... G01B 11/24; G01B 11/2441; G01B 11/255; G01B 9/02034; G01B 9/0209
See application file for complete search history.

(56) References Cited

U.S. PATENT DOCUMENTS

| | | | |
|---|---|---|---|
| 4,872,755 A | 10/1989 | Kuchel et al. | |
| 6,894,788 B2* | 5/2005 | Deck | G01B 11/2441 356/513 |
| 7,230,717 B2 | 6/2007 | Brock et al. | |
| 7,230,718 B2* | 6/2007 | Millerd | G01B 11/303 356/495 |
| 7,777,895 B2 | 8/2010 | Medower et al. | |
| 2003/0090677 A1* | 5/2003 | Evans | G01B 11/2441 356/512 |
| 2012/0236305 A1* | 9/2012 | Zanni | G01J 3/433 356/326 |
| 2013/0010286 A1* | 1/2013 | Zhao | G01B 11/06 356/73 |

OTHER PUBLICATIONS

Lars A. Selberg, "Radius Measurement by Interferometry," Optical Engineering, Sep. 1992, vol. 31 No. 9, p. 1961.

* cited by examiner

*Primary Examiner* — Jonathan Hansen
(74) *Attorney, Agent, or Firm* — Antonio R. Durando (57) ABSTRACT

An interferometer includes a short-coherence source and an internal path-matching assembly contained within its housing. Because path matching occurs within the housing of the interferometer, it is removed from external environmental factors that affect measurements. Therefore, a single cateye measurement of an exemplary surface can be performed in advance and stored as a calibration for subsequent radius-of-curvature measurements. In one embodiment, a path-matching stage is incorporated into a dynamic interferometer where orthogonally polarized test and reference beams are fed to a dynamic imaging system. In another embodiment, orthogonal linearly polarized test and reference beams are injected into a remote dynamic interferometer by means of one single-mode polarization-maintaining optical fiber.

9 Claims, 6 Drawing Sheets

PROVIDE AN INTERFEROMETER WITH A PATH-MATCHING ASSEMBLY HOUSED WITHIN THE INTERFEROMETER HOUSING FOR MINIMIZING THE OPTICAL PATH DIFFERENCE BETWEEN SHORT-COHERENCE TEST AND REFERENCE BEAMS BY SHIFTING A MIRROR ALONG AN OPTICAL AXIS OF THE INTERFEROMETER AND WITH AN ENCODER CONFIGURED TO DETECT A POSITION OF THE MIRROR

↓

MEASURE AN EXEMPLARY TEST SURFACE AT A CATEYE POSITION AND DETERMINE A CORRESPONDING CATEYE POSITION OF THE MIRROR IN THE PATH-MATCHING ASSEMBLY

↓

STORE THE CATEYE POSITION OF THE MIRROR IN THE PATH-MATCHING ASSEMBLY AS A REFERENCE CATEYE POSITION

↓

MEASURE A DIFFERENT TEST SURFACE AT A CONFOCAL POSITION AND DETERMINE A CORRESPONDIGN CONFOCAL POSITION OF THE MIRROR IN THE PATH-MATCHING ASSEMBLY

↓

OBTAIN THE RADIUS OF CURVATURE OF SAID DIFFERENT TEST SURFACE FROM SAID REFERENCE CATEYE POSITION AND SAID CONFOCAL POSITION OF THE MIRROR IN THE PATH-MATCHING ASSEMBLY

FIG. 6

SINGLE-STEP INTERFEROMETRIC RADIUS-OF-CURVATURE MEASUREMENTS UTILIZING SHORT-COHERENCE SOURCES

RELATED APPLICATIONS

This application is based on and claims the priority of U.S. Provisional Application Ser. No. 62/270,492, filed Dec. 21, 2015, and U.S. Provisional Application Ser. No. 62/270,500, filed Dec. 21, 2015, both hereby incorporated by reference.

BACKGROUND OF THE INVENTION

Field of the Invention

The invention relates generally to interferometry. In particular, it relates to a method for measuring the radius of curvature of a lens utilizing a short-coherence source in a single-step procedure.

Description of the Related Art

Figure 1:
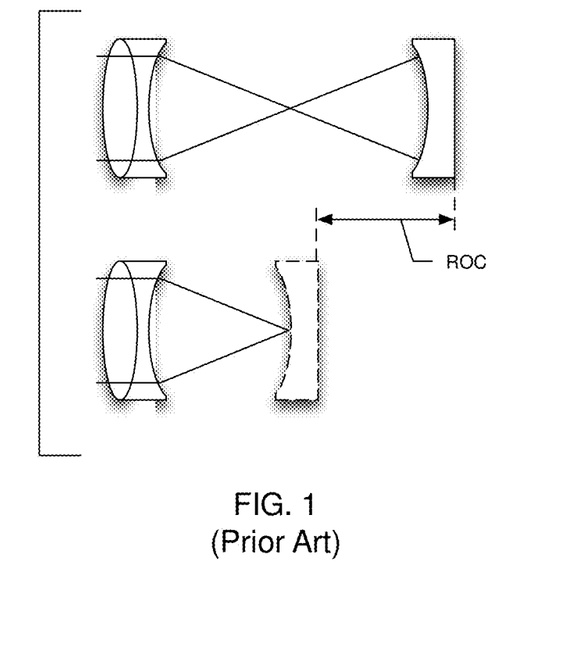
FIG. 1 illustrates the cateye and confocal measurement configurations and the radius of curvature derived therefrom.

Typically, when using an interferometer to measure the radius of curvature (ROC) of a sample, two measurements are taken with the test article placed at different positions along the optical axis. These positions are chosen such that the returning beam reflects back at the same angle as the incident beam producing an interference pattern at the camera that is substantially a single fringe, also known as a "null" fringe. The two locations where "null" fringes are produced are referred to as "cateye" and "confocal" positions. As illustrated in the lower portion of FIG. 1, the cateye position is where the illumination beam comes to focus at the surface of the test article. In doing so, the light incident on the surface reflects back with the same cone angle as the incident beam. The second, confocal, position (shown in the upper portion of FIG. 1) is where the radius of curvature of the test article exactly matches the radius of curvature of the incident test beam. In this configuration, the incident beam is normal to the surface and reflects directly back on itself. (See, for example, Lars A. Selberg, *Optical Engineering*, September 1992, Vol. 31, No. 9, p. 1961.)

The radius of curvature is the difference along the optical axis between the cateye and confocal positions of the test article (or the interferometer, if the interferometer is being translated instead of the article). This distance is typically measured with an encoder or distance measuring interferometer mounted externally to the interferometer. Because the measurement of this distance is carried out externally, that is, along the measurement space of the interferometer, it is subject to the influence of external factors such as environmental conditions and mechanical stresses. Therefore, both the cateye and confocal measurements are required every time the radius of curvature of a sample is determined, even though the nominal cateye position in space relative to the objective should be constant for all samples. In practice, temperature variations and other environmental changes cause it to be shifted enough to prevent a single measurement to be used as the reference for multiple repetitive cateye measurements to determine the ROC of corresponding samples.

In view of the foregoing, one of the challenges with interferometric measurements of the radius of curvature of a test article, especially in high throughput environments where the precision of the ROC is measured for production tolerance purposes, is that it requires two measurements; one in the cateye configuration and one in the confocal configuration. In some applications the cycle time allotted for measurements precludes repositioning the test article in order to take two measurements. As a result, radius of curvature measurements are typically done by random sampling off-line and, by the time an inaccuracy is detected in the production line, many faulty components are produced that must be discarded. This invention is directed at solving this problem.

SUMMARY OF THE INVENTION

The idea of the invention lies in the use of an internal path-matching configuration in the housing of an interferometer in conjunction with a short-coherence source. Because path matching occurs within the housing of the interferometer, it is removed from external environmental factors that affect measurements. Therefore, a single cateye measurement can be performed in advance and stored as a calibration for subsequent ROC measurements.

In a general configuration, a short-coherence source and a beam splitter are used to produce two beams propagated along respective shorter-path and longer-path arms toward corresponding mirrors that reflect them back to the beam splitter for injection into an interferometric setup, such as a Fizeau or a Twymann-Green interferometer. According to the invention, the longer-path arm incorporates a path-matching mechanism that includes a mechanism for translating the longer-path mirror and an encoder for tracking the position of the mirror along the optical axis of the arm. The beams are propagated toward the reference and test surfaces, and the interfering reflected beams are collected at a detector for processing with conventional interferometric methods. Interference fringes are produced only when the time of flight is the same for both the test and reference beams. The null-fringe cateye position of an exemplary test surface is determined conventionally using the internal path-matching stage and it is stored as a reference cateye position, a calibration parameter. Repetitive ROC measurements are accomplished advantageously with a single null-fringe confocal position measurement with reference to the stored cateye measurement.

In a preferred embodiment of the invention, the source light is polarized to produce two orthogonally polarized beams that are reflected from the reference and test surfaces and, after interference, are passed through a pixelated phase mask to produce phase-shifted interferograms that are detected and processed conventionally. As above, the repetitive determination of the radius of curvature of samples intended to have a predetermined geometry is accomplished by a single first cateye-position measurement and then by repeated confocal-position measurements of successive measurements of different samples.

In a particular embodiment of the invention where it is important to reduce the size of the hardware adjacent to the test surface, the interferometer is split into two modules coupled by means of a single-mode polarization-maintaining optical fiber. The first, remote, source module includes the front end of the apparatus for producing orthogonal linearly-polarized beams. The second, interferometric module, placed at the measurement space, includes the back end of the apparatus for producing and detecting the interference signals.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

For the purposes of this specification of the invention, as described and claimed, "short-coherence" of a light source refers to light that has a full-width-half-max coherence length of 1 millimeter or less. The term "orthogonal polarizer" is used to describe any optical device that produces an output of two orthogonally polarized beams. Such beams are preferably, but not necessarily, achromatic. For instance, without limitation, cycloidal diffractive waveplates, birefringent prism pairs such as Wollaston, or interferometers like Fizeau or Twyman-Green with a polarizing beam-splitter coupled to quarter-wave plates, are hereby defined as orthogonal polarizers when configured to produce such output. The terms "dynamic interferometry" and "dynamic interferometer" are defined and used to include any interferometric method and corresponding apparatus where at least three phase-shifted interferograms can be produced simultaneously from two orthogonally polarized beams. The term "dynamic imaging system" is used herein to refer to suitable optical elements used to image said at least three phase-shifted interferograms either on multiple cameras or on a single camera with different sets of pixels configured to detect respective interferograms. For example, the use of a pixelated phase-mask sensor, as described below, is ideal for implementing a dynamic imaging system. The term "path-matching" assembly or stage is used to refer to any shifting mechanism adopted to move a mirror along the optical axis of an interferometric beam to introduce a delay in the path traveled by the beam and includes an encoder to detect the position of the mirror along that path. A "shifting mechanism" refers to any device used in the illumination path to produce such delay with a corresponding temporal phase shift in the resulting fringes detected at the output of the interferometer. The terms "fringes," "fringe pattern" and "interferogram" may be used interchangeably in this description of the invention as referring to the wavefront produced by interfering light beams. Finally, as normally done in the art, it is understood that the term "detector" is used generically to refer to, and is intended to encompass, any device capable of sensing and quantitatively measuring an optical signal impinging on it, such as cameras and charge-coupled devices (CCDs).

According to the invention, an interferometer is configured with internal path matching in conjunction with a short-coherence source. In order to perform repetitive ROC measurements, a single cateye measurement is first carried out and stored as a calibration reference. Subsequent ROC measurements then only require a single measurement of the sample at the "confocal" position, from which the radius of curvature is calculated with reference to the stored cateye measurement.

By placing the path-matching feature of the interferometer internally, the null-position detection and measurement are rendered independent of external mechanical perturbations such as thermal expansion or shifts in the detection mechanism. The interferometer can be designed such that the cateye path-match position remains constant over a wide range of temperature. Therefore, it can be assumed constant in time and stored as a reference measurement obtained by calibration. Accordingly, it is envisioned that a user will perform periodic calibrations on a daily-to-weekly time period, depending upon the environment. In addition, moving the detection internal to the interferometer reduces the complexity of the test setup by eliminating external components.

Figure 2:
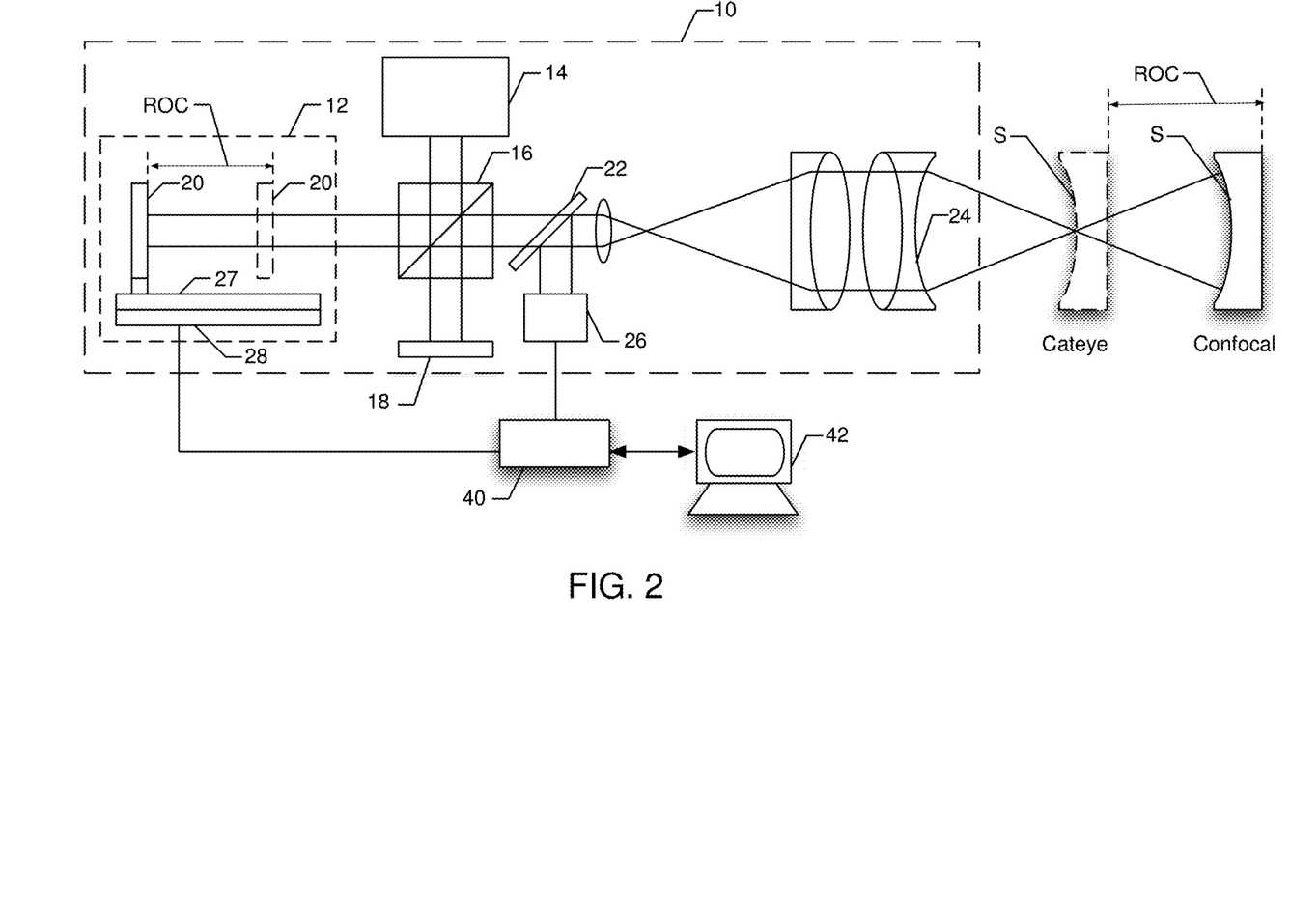
FIG. 2 is a schematic illustration of a Fizeau layout with path matching incorporated internally according to the invention.

An example of a short coherence interferometer that can be used to measure the distance between two surfaces external to the interferometer using an internal path-match assembly with an incorporated encoder is illustrated schematically in FIG. 2. Such an interferometer 10 consists of two stages: a traditional Fizeau interferometer stage and a path-matching stage 12 contained within it. The conventional portion of the interferometer includes a short-coherence source 14, such as a short-coherence laser, a beamsplitter 16 that splits the source beam into a shorter-path beam reflected back by a shorter-path mirror 18 and a longer-path beam reflected back by a longer-path mirror 20 included in the path-matching stage 12 of the interferometer. Upon reflection from their respective mirrors, the two beams are propagated through the beam splitter 16, a second beam splitter 22, and appropriate optics toward the interferometer's reference surface 24 and sample surface S. As one skilled in the art would readily appreciate, in order to measure the radius of curvature of a surface S in an article using the cateye/confocal measurement approach, the position of the test article and the geometry of the reference surface are chosen such that the returning beam reflects back substantially at the same angle as the incident beam, thereby producing an interference pattern at the camera that is a single fringe, also known as a "null" fringe. The term "substantially" is used here to mean the conditions and reference-surface geometry corresponding to the shape of the surface S except for unavoidable imperfections due to manufacture tolerances and other sources or error or deformation. As the test and reference beams are reflected back from the test surface S and the reference surface 24, respectively, they interfere and are reflected by the second beam splitter 22 through appropriate optics to a camera 26.

According to the invention, the path-matching stage 12 includes a shifting mechanism 27 coupled to the mirror 20 and an encoder 28 configured to detect the exact position of the mirror along the optical path of the longer-path beam. By moving the mirror 20 along that optical path, a time delay is introduced in the longer-path beam. When the shorter-path and longer-path beams are recombined at the splitter 16 and launched into the Fizeau interferometer, they both reflect off the test and reference surfaces and return to the camera. Due to the longer optical path to the test beam, the two beams that reflect off the test surface experience a relative time delay when compared to the beams that reflect off the reference surface. Only the beams that experience the same effective time of flight will interfere at the camera. As a result, a peak in the fringe modulation on the camera is achieved only when the delay created in the path-matching arm matches the delay in the test path of the interferometer (the so-called zero optical path difference position—zero OPD). There is a one to one correlation between the relative position of the adjustable mirror 20 in the path-matching stage of the interferometer and the position of the test article when the path-matching stage is adjusted for peak fringe modulation. Consequently, the relative position of the test article can be determined very accurately. As an extension, this can be used to determine the relative position of the test surface at the cateye and confocal positions, from which the radius of curvature is determined, as illustrated in the figure by the distance between the two positions of the mirror 20 (shown in broken line in the position corresponding to the confocal null fringe).

Figure 3:
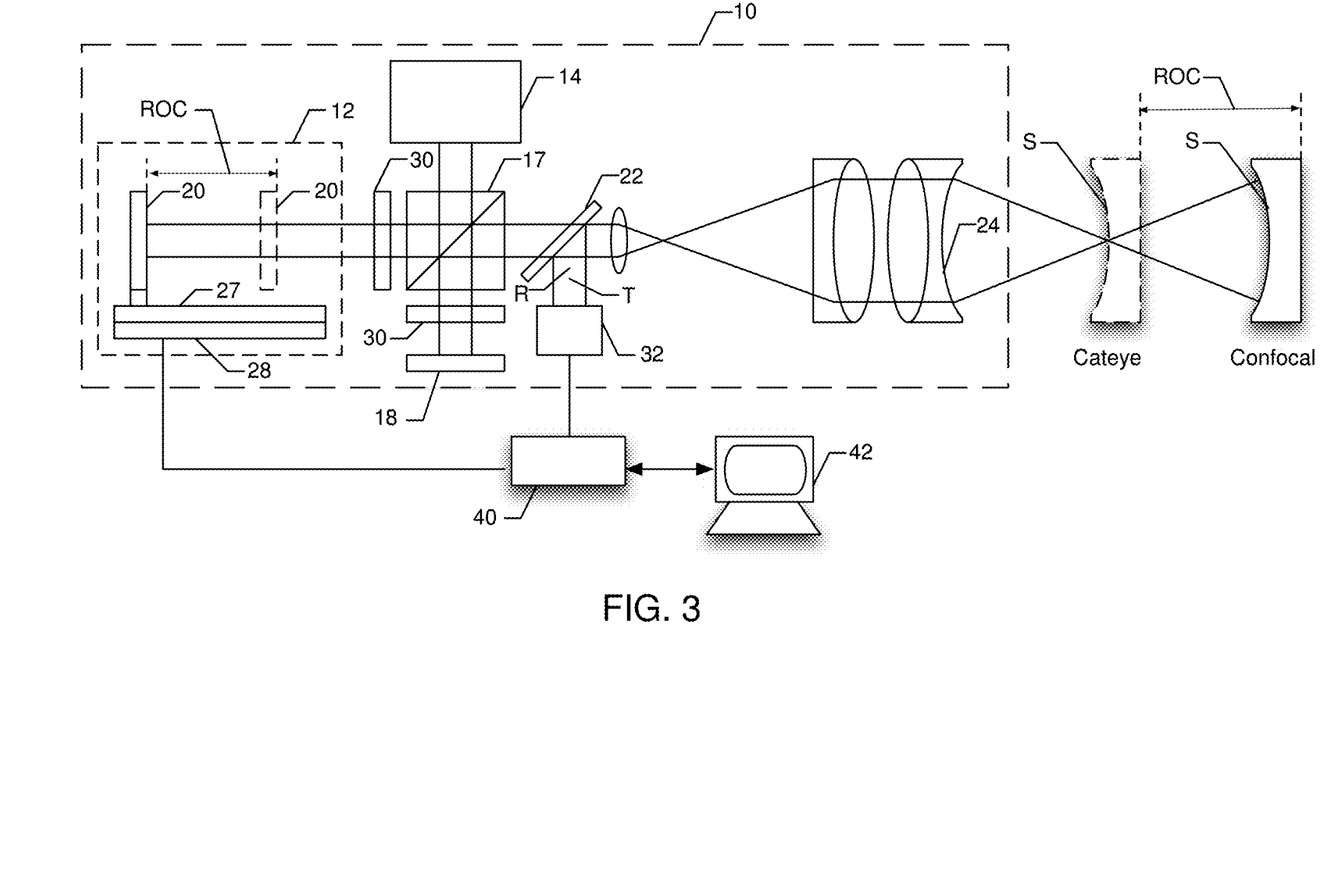
FIG. 3 is a schematic illustration of a Fizeau layout with internal path matching, as in FIG. 2, combined with a polarization based phase-shifting back end in the form of a pixelated phase mask and sensor assembly.
Figure 4:
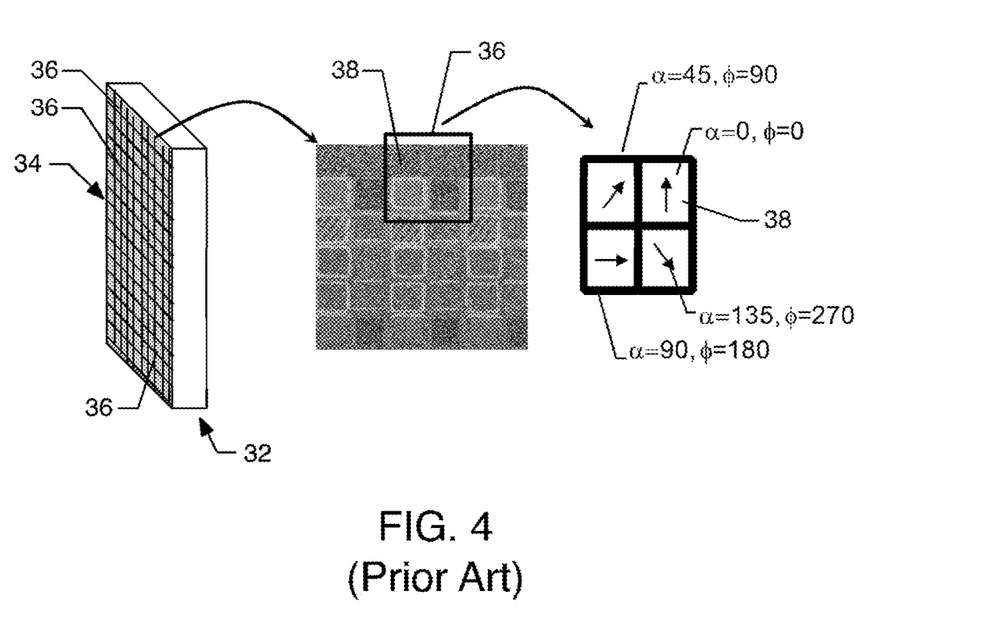
FIG. 4 illustrates an exemplary pixelated phase mask and sensor assembly comprising an array of wire grid micropolarizers on a glass substrate bonded to a detector array.

4D Technology's Fizcam 2000 interferometer (U.S. Pat. No. 7,230,718) is an example of a short coherence interferometer that can be used to measure the distance between two surfaces external to the interferometer using an internal path-matching assembly with an incorporated encoder. Referring to FIG. 3, a Fizeau implementation is illustrated where the path-matching assembly 12 includes an encoder 28 that encodes the two relatively delayed beams with orthogonal polarizations provided by a polarizing beam splitter 17 coupled to quarter-wave plates 30 to facilitate the use of polarization based phase-shifting methods (dynamic interferometry and dynamic imaging systems) such as described in co-owned U.S. Pat. No. 7,777,895, herein incorporated by reference, where the back end of the interferometer incorporates a pixelated phase-mask sensor assembly 32 (i.e., a pixelated phase mask coupled with a detector of some kind). As detailed in co-owned U.S. Pat. No. 7,230,717, also herein incorporated by reference, and illustrated in FIG. 4, an exemplary such assembly 32 includes a pixelated phase mask 34 subdivided into a plurality of sets 36 of phase-mask pixels 38, such that each set produces a predetermined phase shift between orthogonally polarized test and reference beams. Thus, each set 36 of phase-mask pixels 38 provides a spatially separated fringe pattern (interferogram) on corresponding pixels of the detector. By providing at least three such sets of phase-mask pixels, each associated with a different phase shift, sufficient interferograms are produced to characterize a sample surface using conventional interferometric algorithms implemented in a computer 40. As conventionally done, a monitor 42 that includes interactive controls (keyboard, mouse, joy stick) is also provided for viewing the output of the interferometer and controlling the operation of the path-matching stage 12. For best results, the phase-mask pixels are preferably distributed uniformly throughout the phase mask in unit cells so that each pixel in a cell is surrounded by adjacent pixels belonging to other sets. Similarly, for best resolution, a one-to-one correspondence is preferably used between the phase-mask and the detector pixels. The exemplary pixelated phase-mask sensor assembly of FIG. 4 comprises an array of wire grid micro-polarizers on a glass substrate bonded to a detector array.

Referring back to FIG. 3, the path-matching stage 12 is used to generate two beams separated by an optical path delay, as taught by Kuchel et al. in U.S. Pat. No. 4,872,755. The input beam L is directed by the polarizing beam splitter 17 toward the two mirrors 18 and 20 through respective quarter-wave plates 30 along orthogonal optical paths differing in length by such optical delay. The two beams reflected by the mirrors are then redirected by the beam splitter 17 and injected into the Fizeau interferometer through the beam splitter 22 and appropriate optics to impinge on the reference surface 24 and the test surface S. The reflected orthogonally polarized test and reference beams (T and R) are collimated and directed through appropriate optics toward the pixelated phase-mask sensor assembly 32. In general, the length of the delay produced by the path-matching stage is adjusted to produce the same path delay as in the Fizeau cavity, so that the reference beam R and the test beam T are temporally coherent and yield high-contrast interference fringes in the spatial phase-shift interferometer constituted by the pixelated phase mask 34. As applied to the present invention, the path-matching stage 12 includes an encoder 28 used to determine the two positions of the mirror 20 corresponding to the cateye and confocal positions of the surface S from which the radius of curvature is obtained, as indicated in the figure.

For industrial ROC-measurement applications, it is often imperative to utilize small interferometers to save valuable production line space, to provide flexibility where the interferometer is mounted, and to provide easy access for servicing the interferometer's laser source. One key method for minimizing the size of an interferometer is to remove the light source from the main housing and feed the light into the interferometer by way of a single-mode polarization-maintaining fiber. This implementation is used in cases where a single linearly polarized beam is launched from the fiber and the test and reference beams are separated inside the main interferometer head.

However, in some interferometer configurations, such as illustrated in FIG. 3, the test and reference beams need to be separated in polarization before they are launched into the interferometer. In such cases, two orthogonally polarized beams are produced in the source module and fed to the interferometer. If the light source is removed from the interferometer and each beam is transported to the interferometer in a separate dedicated fiber, path matching becomes difficult to achieve. Therefore, according to another aspect of the present invention, orthogonal linearly-polarized test and reference beams are coupled to the input of the remote interferometric module using a single polarization-maintaining fiber. By aligning one beam with the slow-axis of the optical fiber and the other beam with the fast-axis, the beams are propagated to the input of the interferometric module without any material effect on their respective polarizations.

Figure 5:
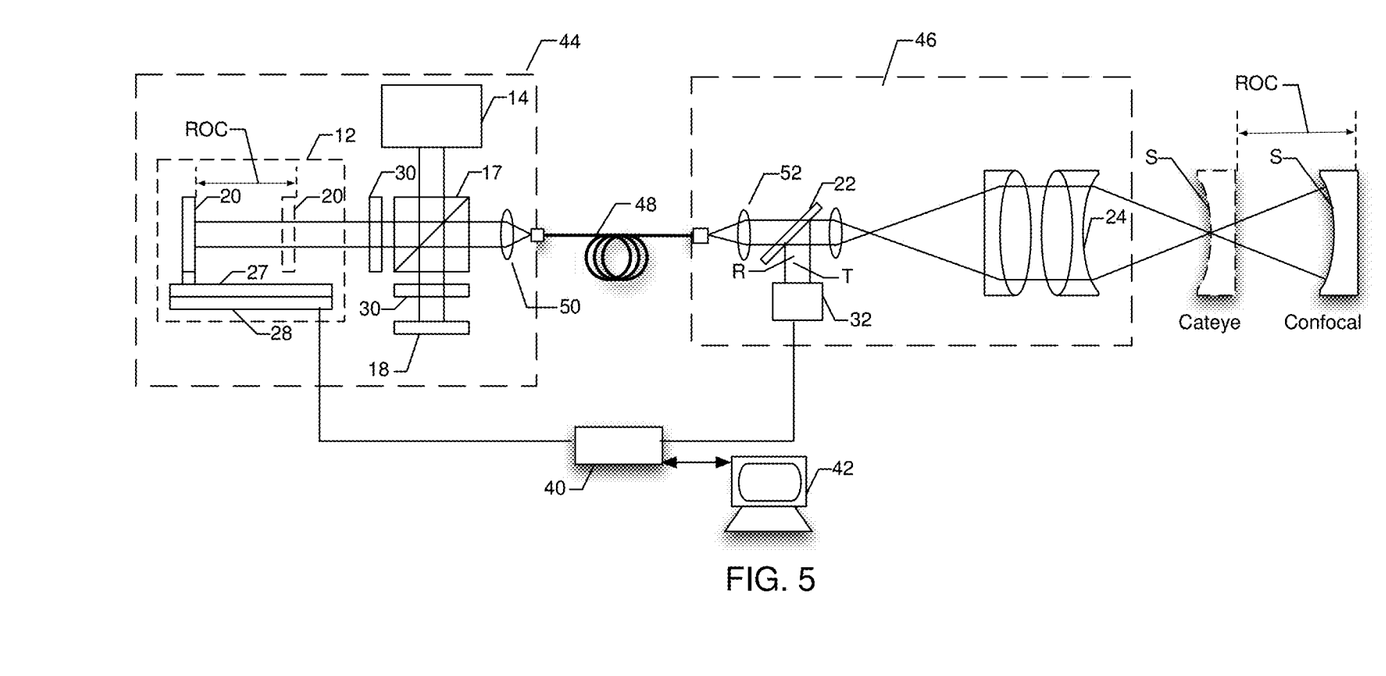
FIG. 5 shows an example of orthogonally polarized beams propagated to an interferometer through a single polarization-maintaining fiber.

FIG. 5 illustrates the concept using the front and back ends of the interferometer of FIG. 3. The front end module 44 of the interferometer (the source module) includes the short-coherence source 14, the polarizing beam splitter 17, the quarter-wave plates 30, the shorter-path mirror 18, and the longer-path mirror 20 and shifting mechanism 27 included in the path-matching stage 12. The back end module 46 of the interferometer (the interferometric module) includes the second beam splitter 22, appropriate optics toward the reference surface 24 and back toward the pixelated phase-mask sensor assembly 32. The two modules are coupled via one single-mode polarization-maintaining optical fiber 48 according to this aspect of the invention. The short-coherence source 14 is used to produce two orthogonally polarized beams with a relative delay ΔL that are injected into the fiber through focusing optics 50 along respective slow and fast paths, thereby maintaining their polarization at the input of the interferometer where they are forwarded through corresponding collimating optics 52. The path-matching stage with a conventional shifting mechanism 27 is used to match the paths of the test and reference beams fed into the fiber and to find the null-fringe positions of the test surface S using the encoder 28, as taught above. Appropriate processing apparatus 40 and monitoring and control apparatus 42 are provided to receive the output of the encoder 28 and the pixelated phase mask-sensor assembly 32.

Figure 6:
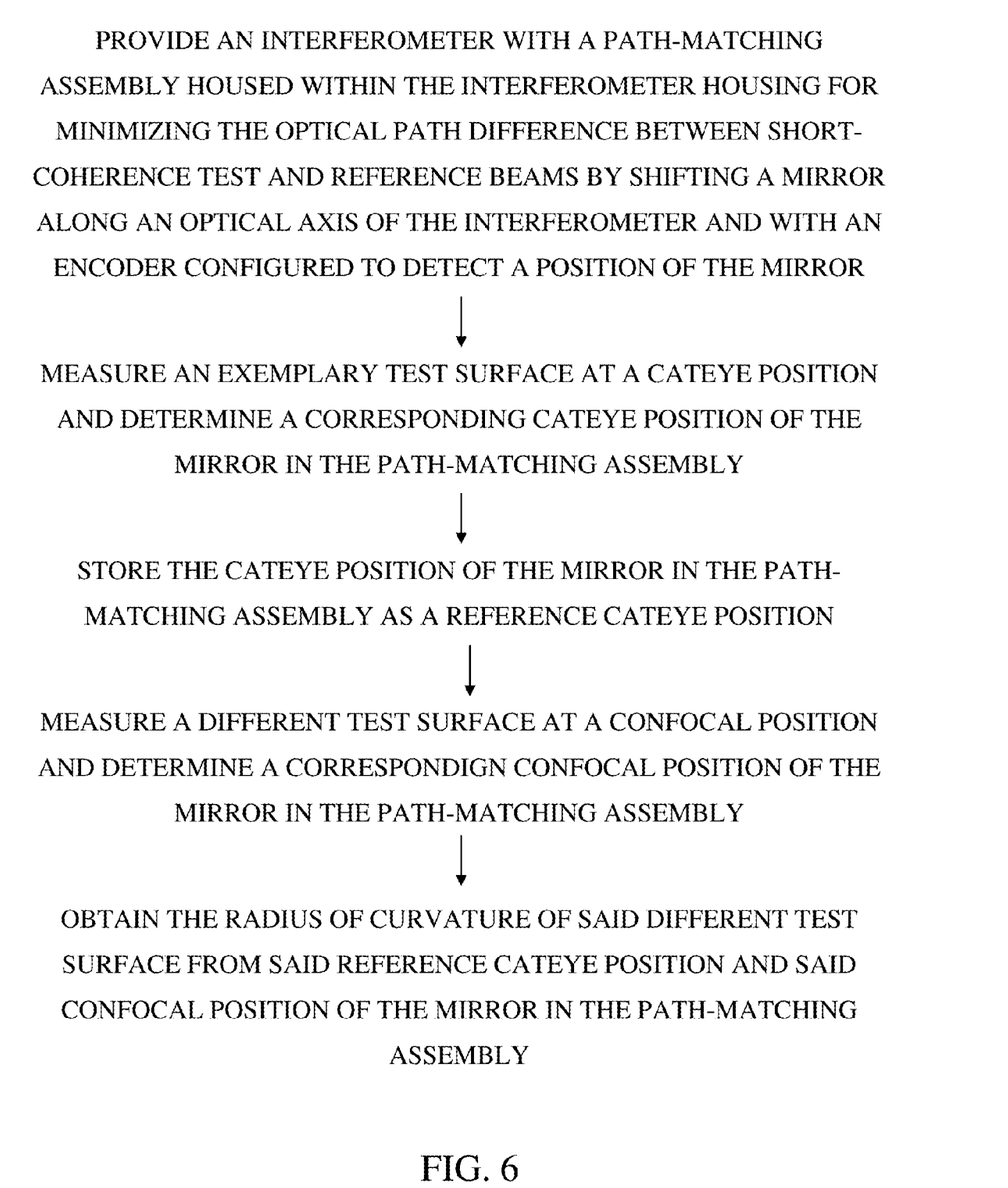
FIG. 6 is a flow-chart of the essential steps required for practicing the inventions.

Thus, a simple approach has been described to measure the radius of curvature of a surface of known geometry for testing purposes inline in a process for manufacturing copies of the same article. A single periodic measurement of the cateye null-fringe position of the article serves as a reference parameter for comparison with the confocal null-fringe position determined in subsequent measurements of the articles being produced. In each case, the ROC of the measured surface in an article is readily obtained from the difference between the confocal position and the reference parameter. FIG. 6 is a flow-chart outline of the critical steps involved in practicing the invention.

The invention has been shown and described herein in what is believed to be the most practical and preferred embodiments, but it is recognized that departures can be made therefrom. For example, while helpful, polarization is not required for incorporating the path-matching stage into the interferometer for the purpose of locating the relative positions of the test surface at cateye and confocal locations. Also, the invention has been described using a Fizeau configuration, but path matching can easily be incorporated into other interferometer configurations such as, for example, the Twyman[n]-Green interferometer. For example, it is anticipated that the invention could be practiced as well with interferometers configured as an unpolarized Twyman-Green, an unpolarized Twyman-Green with spatial carrier phase-shifting, a polarized Twynman-Green with a pixelated sensor, a Twyman-Green with a fiber-coupled path-matching assembly, and an unpolarized Fizeau with spatial carrier phase-shifting. Therefore, the invention is not to be limited to the disclosed details but is to be accorded the full scope of the claims to embrace any and all equivalent apparatus and methods.

The invention claimed is:

1. A method for measuring a radius of curvature of a test sample with a single confocal measurement, the method comprising the following steps:
    providing an interferometer comprising a path-matching assembly for minimizing an optical path difference between short-coherence test and reference beams by shifting a mirror along an optical axis of the interferometer, said assembly being housed internally within the interferometer; and
    an encoder in the path-matching assembly configured to detect a position of said mirror;
    measuring an exemplary test surface at a cateye position;
    determining a corresponding cateye position of the mirror in the path matching assembly;
    storing said cateye position of the mirror in the path-matching assembly as a reference cateye position;
    measuring a different test surface at a confocal position;
    determining a corresponding confocal position of the mirror in the path-matching assembly; and
    obtaining the radius of curvature of said different test surface from said reference cateye position and said confocal position of the mirror in the path-matching assembly.

2. The method of claim 1, further including the step of repeating the steps of measuring a different test surface, determining a corresponding confocal position of the mirror, and obtaining the radius of curvature of said different test surface.

3. The method of claim 1, wherein said interferometer further comprises:
    a short-coherence light source producing said test and reference beams;
    an interferometric setup adapted to receive the test and reference beams;
    a light sensor detecting interferograms produced by the interferometric set up; and
    a processor programmed to perform an interferometric measurement of a test surface based on said interferograms.

4. The method of claim 3, wherein said test and reference beams are orthogonally polarized and said interferometric setup and light sensor are included in a dynamic imaging system for carrying out dynamic interferometry.

5. The method of claim 4, wherein said interferometric setup is a Fizeau configuration, said test and reference beams are orthogonally polarized by a polarizing beam splitter and respective quarter-wave plates, and said dynamic imaging system includes a pixelated phase-mask sensor.

6. The method of claim 3, wherein said interferometric setup and light sensor are included in a separate interferometric module, said test and reference beams are orthogonal and linearly polarized and are injected into the module via a single-mode polarization-maintaining optical fiber by aligning one of said beams with a slow-axis of the optical fiber and another of said beams with a fast-axis of the optical fiber.

7. The method of claim 6, wherein said interferometric setup is a Fizeau configuration, said test and reference beams are orthogonal and linearly polarized by a polarizing beam splitter and respective quarter-wave plates, and said separate interferometric module includes a dynamic imaging system for carrying out dynamic interferometry.

8. The interferometer of claim 7, wherein said dynamic imaging system includes a pixelated phase-mask sensor.

9. The method of claim 1, wherein said interferometer is a Twyman-Green interferometer.

* * * * *